(12) United States Patent
Desai et al.

(10) Patent No.: US 9,792,046 B2
(45) Date of Patent: Oct. 17, 2017

(54) STORAGE MODULE AND METHOD FOR PROCESSING AN ABORT COMMAND

(71) Applicant: SanDisk Technologies Inc., Plano, TX (US)

(72) Inventors: Girish Desai, Cupertino, CA (US); Daniel E. Tuers, Kapaa, HI (US)

(73) Assignee: SanDisk Technologies LLC, Plano, TX (US)

(*) Notice: Subject to any disclaimer, the term of this patent is extended or adjusted under 35 U.S.C. 154(b) by 68 days.

(21) Appl. No.: 14/448,762

(22) Filed: Jul. 31, 2014

(65) Prior Publication Data

US 2016/0034187 A1 Feb. 4, 2016

(51) Int. Cl.
G06F 3/06 (2006.01)
G06F 9/30 (2006.01)

(52) U.S. Cl.
CPC ............ G06F 3/061 (2013.01); G06F 3/0659 (2013.01); G06F 3/0679 (2013.01); G06F 3/0688 (2013.01); G06F 3/0634 (2013.01); G06F 9/30076 (2013.01)

(58) Field of Classification Search
CPC ..... G06F 3/0634; G06F 3/0659; G06F 3/0679
See application file for complete search history.

(56) References Cited

U.S. PATENT DOCUMENTS

| | | | | |
|---|---|---|---|---|
| 5,829,010 A * | 10/1998 | Cherabuddi | ........ | G06F 13/4243 711/100 |
| 6,148,384 A * | 11/2000 | Devanagundy | ..... | G06F 12/1433 711/103 |
| 6,275,242 B1 * | 8/2001 | Shah | ........................ | G06F 13/28 345/503 |
| 7,818,479 B2 * | 10/2010 | Takeuchi | .............. | G06F 13/385 709/234 |
| 7,836,269 B2 * | 11/2010 | Obereiner | ........... | G06F 12/1483 710/5 |
| 2004/0264284 A1 * | 12/2004 | Priborsky | ............. | G06F 3/0605 365/232 |
| 2005/0162897 A1 * | 7/2005 | Alva | ........................ | G06F 3/061 365/158 |
| 2012/0331207 A1 * | 12/2012 | Lassa | .................... | G06F 1/3278 711/103 |
| 2013/0067143 A1 * | 3/2013 | Hasegawa | ............. | G06F 3/0611 711/103 |

* cited by examiner

*Primary Examiner* — Hashem Farrokh
*Assistant Examiner* — Michelle Taeuber
(74) *Attorney, Agent, or Firm* — Brinks Gilson & Lione (57) ABSTRACT

A storage module and method for virtual abort are disclosed. In one embodiment, a virtual abort of a read command is provided. The read command triggers a read operation that comprises reading data from the storage module's memory, processing the data by at least one processing module as the data moves along a data path from the memory to the storage module's host interface module, and then providing the data to a host via the host interface module. When an abort command is received, the storage module allows the data that is read from the memory to be processed by the at least one processing module as the data moves along the data path to the host interface module but prevents the host interface module from providing the data to the host. In another embodiment, a virtual abort of a write command is provided.

20 Claims, 7 Drawing Sheets

STORAGE MODULE AND METHOD FOR PROCESSING AN ABORT COMMAND

BACKGROUND

A storage module may receive host commands from a host, including read commands and write commands. To execute the host commands, the storage module may include a plurality of processing modules and queues that generate and queue commands, so that data may be successfully read from or written to memory in the storage module. In some situations, the host may subsequently send an abort command to abort one or more pending host commands. Upon receipt, the abort command may be broadcast or spread out across the various processing modules. In turn, the processing modules may analyze associated queues and filter out any commands that are associated with the host command or commands to be aborted. Additionally, during this time, any hardware components, including those in the host interface, may be paused, and data communication may be halted to ensure that the hardware components do not execute any commands that should be aborted. Given that several host commands may be pending at single time, performance may be significantly degraded when operation is halted, and the various processing modules have to filter out associated queues to successfully abort a host command.

OVERVIEW

Embodiments of the present invention are defined by the claims, and nothing in this section should be taken as a limitation on those claims.

By way of introduction, the below embodiments relate to a storage module and method for virtual abort. In one embodiment, a virtual abort of a read command is provided. The read command triggers a read operation that comprises reading data from the storage module's memory, processing the data by at least one processing module as the data moves along a data path from the memory to the storage module's host interface module, and then providing the data to a host via the host interface module. When an abort command is received, the storage module allows the data that is read from the memory to be processed by the at least one processing module as the data moves along the data path to the host interface module but prevents the host interface module from providing the data to the host.

In another embodiment, a virtual abort of a write command is provided. The write command triggers a write operation that comprises generating one or more context commands used to initiate a transfer of data associated with the write command from the host to the storage module. In response to receiving an abort command, the host interface module ignores the one or more context commands to transfer data.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

The following embodiments can be used to perform a virtual abort command to overcome the problems discussed in the background section above. Before turning to these and other embodiments, the following paragraphs provide a discussion of exemplary storage modules that can be used with these embodiments. Of course, these are just examples, and other suitable types of storage modules can be used.

Figure 1:
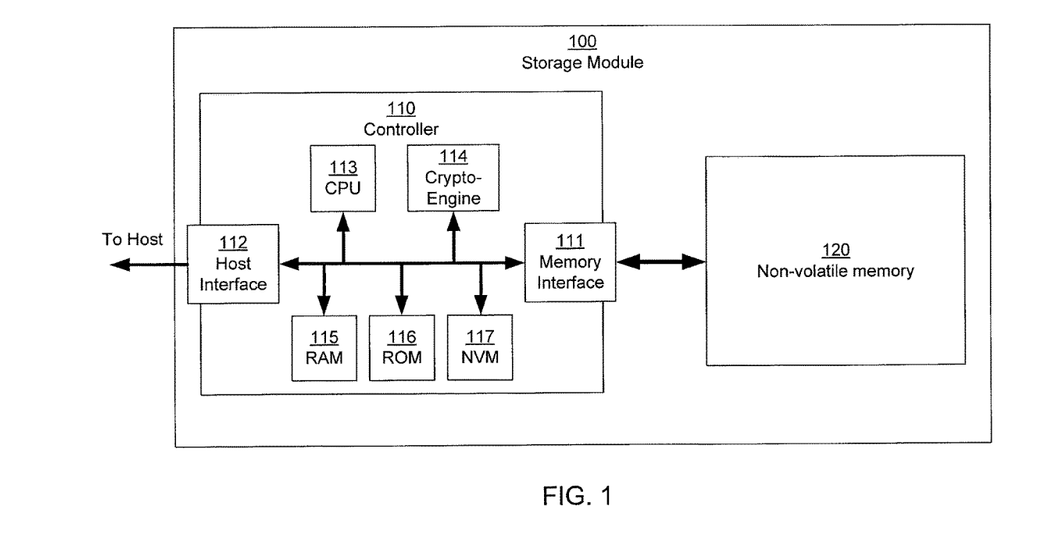
FIG. 1 is a block diagram of an exemplary storage module of an embodiment.

As illustrated in FIG. 1, a storage module 100 of one embodiment comprises a storage controller 110 and non-volatile memory 120. The storage controller 110 comprises a memory interface 111 for interfacing with the non-volatile memory 120 and a host interface 112 for placing the storage module 100 operatively in communication with a host controller. As used herein, the phrase "operatively in communication with" could mean directly in communication with or indirectly in (wired or wireless) communication with through one or more components, which may or may not be shown or described herein.

Figure 2A:
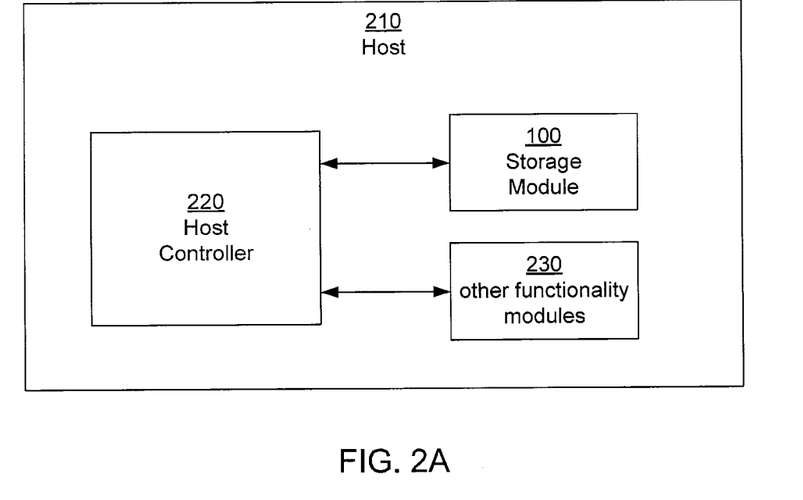
FIG. 2A is a block diagram of a host of an embodiment, where the exemplary storage module of FIG. 1 is embedded in the host.

As shown in FIG. 2A, the storage module 100 can be embedded in a host 210 having a host controller 220. That is, the host 210 embodies the host controller 220 and the storage module 100, such that the host controller 220 interfaces with the embedded storage module 100 to manage its operations. For example, the storage module 100 can take the form of an iNAND™ eSD/eMMC embedded flash drive by SanDisk Corporation, or, more generally, any type of solid state drive (SSD), a hybrid storage device (having both a hard disk drive and a solid state drive), and a memory caching system. The host controller 220 can interface with the embedded storage module 100 using, for example, an eMMC host interface, a UFS interface, a NVMe host interface, a SAS host interface, or a SATA host interface. The host 210 can take any form, such as, but not limited to, an Enterprise Solid State Storage Device, a mobile phone, a tablet computer, a digital media player, a game device, a personal digital assistant (PDA), a mobile (e.g., notebook, laptop) personal computer (PC), or a book reader. As shown in FIG. 2A, the host 210 can include optional other functionality modules 230. For example, if the host 210 is a mobile phone, the other functionality modules 230 can include hardware and/or software components to make and place telephone calls. As another example, if the host 210 has network connectivity capabilities, the other functionality modules 230 can include a network interface. Of course, these are just some examples, and other implementations can be used. Also, the host 210 can include other components (e.g., an audio output, input-output ports, etc.) that are not shown in FIG. 2A to simplify the drawing. It should be noted that while the host controller 220 can control the storage module 100, the storage module 100 can have its own controller to control its internal memory operations.

Figure 2B:
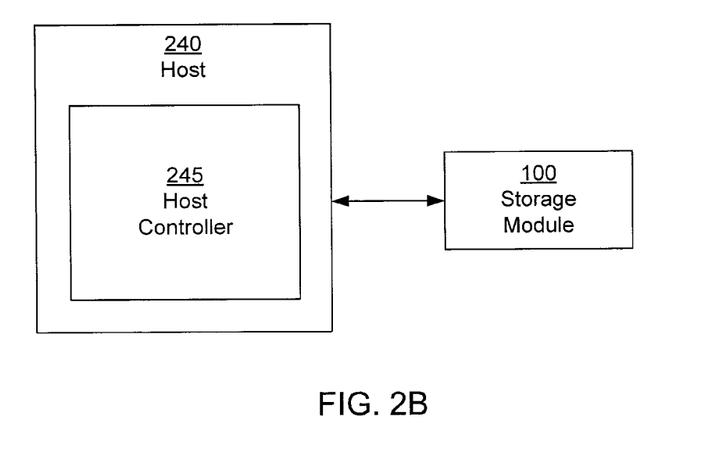
FIG. 2B is a block diagram of the exemplary storage module of FIG. 1 removably connected to a host, where the storage module and host are separable, removable devices.

As shown in FIG. 2B, instead of being an embedded device in a host, the storage module 100 can have physical and electrical connectors that allow the storage module 100 to be removably connected to a host 240 (having a host controller 245) via mating connectors. As such, the storage module 100 is a separate device from (and is not embedded in) the host 240. In this example, the storage module 100 can be a handheld, removable memory device, such as a Secure Digital (SD) memory card, a microSD memory card, a Compact Flash (CF) memory card, a universal serial bus (USB) device (with a USB interface to the host), or a solid-state drive (SSD), and the host 240 is a separate device, such as a mobile phone, a tablet computer, a digital media player, a game device, a personal digital assistant (PDA), a mobile (e.g., notebook, laptop) personal computer (PC), or a book reader, for example.

In FIGS. 2A and 2B, the storage module 100 is in communication with a host controller 220 or host 240 via the host interface 112 shown in FIG. 1. The host interface 112 can take any suitable form, such as, but not limited to, an eMMC host interface, a UFS interface, and a USB interface. The host interface 110 in the storage module 110 conveys memory management commands from the host controller 220 (FIG. 2A) or host 240 (FIG. 2B) to the storage controller 110, and also conveys memory responses from the storage controller 110 to the host controller 220 (FIG. 2A) or host 240 (FIG. 2B). Also, it should be noted that when the storage module 110 is embedded in the host 210, some or all of the functions described herein as being performed by the storage controller 110 in the storage module 100 can instead be performed by the host controller 220.

Returning to FIG. 1, the storage controller 110 comprises a central processing unit (CPU) 113, an optional hardware crypto-engine 114 operative to provide encryption and/or decryption operations, read access memory (RAM) 115, read only memory (ROM) 116 which can store firmware for the basic operations of the storage module 100, and a non-volatile memory (NVM) 117 which can store a device-specific key used for encryption/decryption operations, when used. The storage controller 110 can be implemented in any suitable manner. For example, the storage controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from SanDisk or other vendors. The storage controller 110 can be configured with hardware and/or software to perform the various functions described below and shown in the flow charts. Also, some of the components shown as being internal to the storage controller 110 can also be stored external to the storage controller 110, and other component can be used. For example, the RAM 115 (or an additional RAM unit) can be located outside of the controller die and used as a page buffer for data read from and/or to be written to the memory 120.

The non-volatile memory 120 can also take any suitable form. For example, in one embodiment, the non-volatile memory 120 takes the form of a solid-state (e.g., flash) memory and can be one-time programmable, few-time programmable, or many-time programmable. The non-volatile memory 120 can also use single-level cell (SLC), multiple-level cell (MLC), triple-level cell (TLC), or other memory technologies, now known or later developed. Also, the non-volatile memory 120 can be a two-dimensional memory or a three-dimensional memory.

With an exemplary storage device now described, the following paragraphs discuss embodiments that can be used to perform a virtual abort. As mentioned in the background section above, in prior storage modules, when an abort command is received for a read operation, commands to abort various internal processes are propagated to various processing modules in the data path from the memory to the host interface module. Such propagation and the actions associated therewith can degrade performance of the storage module. To address this problem, the following embodiments provide a "virtual abort" scenario in which, instead of propagating the abort commands to the various processing modules, the data flows through the data path and is processed as normal, but the host interface module is prevented from providing the data to the host. A virtual abort can also be performed for a write operation, in which case the host interface module ignores one or more context commands to transfer data.

With this general overview of virtual abort now provided, the following paragraphs describe several exemplary implementations.

Returning to FIG. 1, the storage controller 110 may be configured to control and manage storage of data in the storage module 110. In addition, the storage controller 110 may receive host commands from a host (e.g. the host 210 in FIG. 2A or the host 240 in FIG. 2B); process and execute the host command; and respond back to the host when execution of a host command is complete. Example host commands may include a host read command to read or retrieve data stored in the storage module 100, a host write command to write or store data to the storage module 100, and an abort command to abort or stop one or more other host commands, such as one or more host read and/or write commands, from being executed. Other types of host commands, including those that are media related and non-media related, are possible. Media related host commands may include host commands that involve back-end storage and retrieval of data in the non-volatile memory 120, such as read and write commands. Non-media related host commands may include host commands where back-end processing for storage and retrieval of data is not involved. An example of a non-media host command may be a request for storage module identification, where a front-end component of the storage module 100 returns the identification of the storage module 100 and does not need to communicate with back-end processing or retrieve data stored in the non-volatile memory 120 to do so.

Figure 3:
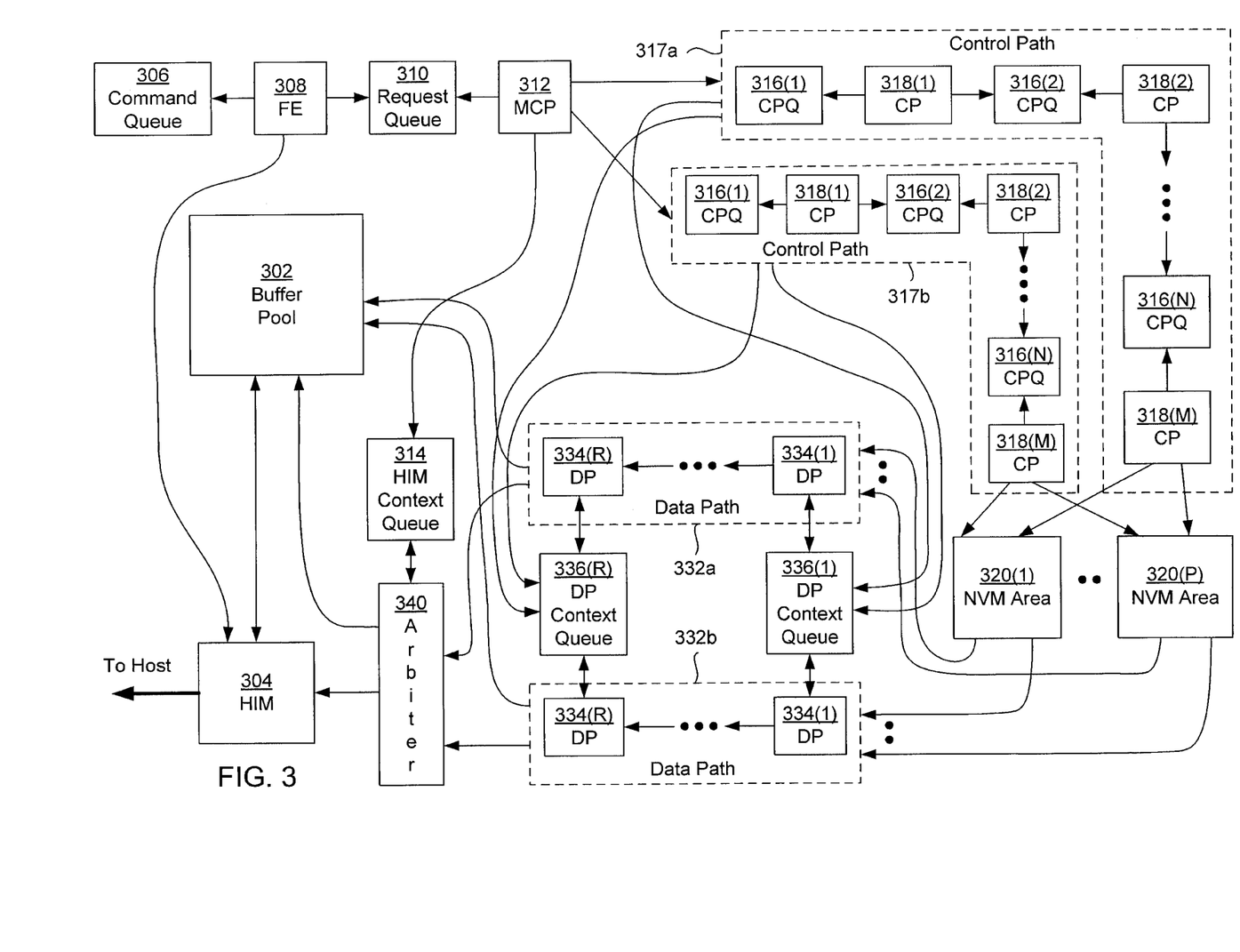
FIG. 3 is a block diagram of exemplary processing modules of the storage module of FIG. 1 used to execute a host read command.

Referring to FIG. 3, the storage controller 110 may include a plurality of processing modules and a plurality of queues. The plurality of processing modules may perform various operations for execution of a host read command to read data stored in the non-volatile memory 120. The processing modules may queue commands or other messages in the queues, which may then be retrieved by other processing modules for performance of their respective functions. Each of the processing modules may be implemented in hardware, such as hardware logic circuitry, software or firmware stored in memory of the storage controller 110 and executed by the CPU 113, or a combination thereof.

In further detail, when a host read command is received by the storage controller 110, it may be placed in a command queue 306, which may queue the host read command along with other media and non-media related host commands. A front end (FE) module 308 may retrieve the read command, along with other media-related commands, and place the read command in a request queue 310. A media control processing (MCP) module 312 may retrieve the read command in the request queue 310 and generate one or more sets of one or more context commands. The context commands may be commands used internally by other modules of the storage module 100 to identify and properly process the data for execution of the associated read command. Among other information, each context command may include an attribute or identifier that identifies the host command with which the context command is associated. Additionally, a number of context commands that are generated may correspond to the size of the data to be read as identified in the associated host read command. Each context command may correspond to a portion or sector of the data to be read. To illustrate, suppose the host read command is for 64 kB of data to be read. Further, suppose that each context command corresponds 8 kB of the 64 kB of data. The MCP module 312 may then generate 8 context commands in a set for reading, processing, and sending the all 64 kB of the data to the host.

The MCP module 312 may generate multiple sets of context commands for multiple processing modules. For example, as described in further detail below, the MCP module 312 may generate and place in a HIM context queue 314 a set of context commands for use by the HIM module 304 for transferring data from the buffer pool 302 to the host. In addition, the MCP module 312 may generate and place one or more sets of context commands in one or more command processing queues (CPQ) 316(1) to 316(N) of one or more control paths 317a, 317b. FIG. 3 shows two control paths, 317a and 317b, although any number of one or more control paths may be possible. In general, the control paths 317a, 317b may each include an M-number of control processing (CP) modules 318(1) to 318(M) and an N-number of command processing queues 316(1) to 316(N), where M and N may the same or different. The control processing modules 318(1) to 318(M) may perform various processes or operations to have data associated with host read commands transferred from the non-volatile memory 120 to the controller 110 (see FIG. 1). Example processes or operations may include address translation in which logical addresses recognized by the host are translated to physical addresses at which the data is stored; generating sense and data transfer context commands that instruct the non-volatile memory 120 to sense and transfer the sensed data to the controller 110; determining sequencing of the context commands; and issuing the context commands to a P-number of non-volatile memory areas 320(1) to 320(P) (e.g., chips, dies, etc.) of the non-volatile memory 120. Other or additional processes or operations to transfer data from the non-volatile memory 120 to the controller 110 may be possible.

The MCP module 312 may queue context commands in one or more of the control processing queues 316(1) to 316(N) in the control paths 317a, 317b, which may be retrieved and used by one or more of the control processing modules 318(1) to 318(M) in the control paths 317a, 317b to perform their respective operations. The control processing modules 318(1) to 318(M) may also queue commands or other information in the control processing queues 316(1) to 316(N) for retrieval by other control processing modules 318(1) to 318(M). Various configurations or implementations of the control processing modules 318(1) to 318(M) and the control processing queues 316(1) to 316(N) in the control paths 317a, 317b may be possible.

Data transferred from the non-volatile memory areas 320(1) to 320(P) to the controller 110 may be transferred along one or more data paths 332a, 332b. FIG. 3 shows two data paths, 332a 332b, although any number of one or more data paths may be possible. Data transferred along a data path 332a, 332b may be sent to a buffer pool 302, which may be part of RAM 115 and/or NVM 117 of the storage controller 110. A host interface module (HIM) 304, which may be part of the host interface 112 in FIG. 1, may then transfer the data stored in the buffer pool 302 to the host for execution of the host read commands.

Each of the data paths 332a, 332b may include an R-number of data processing (DP) modules 334(1) to 334(R) that perform various processes or operations on the data before the data is sent to the host. Example processes or operations may include error correction, decryption and/or decoding. Other processes or operations performed on the data in the data paths 332a, 332b may be possible.

For some example configurations, one or more control processing modules 318(1) to 318(M) in the control paths 317a, 317b may generate sets of context commands for the data processing modules 334(1) to 334(R) in the control paths 332a, 332b. These context commands may include information that the data processing modules 334(1) to 334(R) may use when performing their respective data processing operations on the data. The control processing modules 318(1) to 318(M) may queue the context commands in data path (DP) context queues 336(1) to 336(R), and the data processing modules 334(1) to 334(R) in the data paths 332a, 332b may retrieve the context commands from the data path context queues 336(1) to 336(R) when processing the data.

The data may be sent to and processed by some or all of the data processing modules 334(1) to 334(R). After the data is processed in the data paths 332a, 332b, the data may be sent to the buffer pool 302 for temporary storage before it is sent to the host.

As previously described, the MCP module 312 may generate a set of context commands including information that the HIM module 304 may use to transfer data stored in the buffer pool 302 to the host. An arbiter module 340 may be configured to determine when data associated with a host read command is ready to be sent to the host. For some example configurations, the arbiter module 340 may determine that data stored in the buffer pool 302 is ready to be sent to the host when the data in the buffer pool 302 comprises all or at least a threshold amount of the data requested to be read by the read host command. When the arbiter determines that data is available to be sent to the host, the arbiter module 340 may pull out a HIM context command associated with the data and send the HIM context command to the HIM module 304. In response to the HIM context command, the HIM module 304 may enter or transition to a data transfer mode and receive a data packet from the buffer pool 302 that includes data identified by the HIM context command. The HIM module 304 may then send the received data packet to the host. After sending the data packet to the host, the HIM module 304 may release any context command resources used to store the HIM context command in the HIM context queue 314 as well as release any buffer resources used to store the data in the buffer pool 302.

Additionally, when sending the data packet to the host, the HIM module 304 may update a counter that keeps track of the HIM context queues and/or data packets associated with a read request. When the counter reaches a threshold count or value, the HIM module 304 may identify that it has received all of the HIM context commands and/or has sent all of the data packets associated with the host read command to the host. For example, using the illustration above where the MCP module 312 determined to generate 8 context commands, after the counter counts that eight HIM context commands have been received or eight data packets have been received from the buffer pool 302 and sent to the host, the counter may determine that all of the data associated with the host read command has been sent to the host.

For some example configurations, the threshold count or value may be based on a length or size of the data to be sent to the host to complete a host read request. Each HIM context command and associated data packet may be used to transfer a sector of the maximum length of the data. The counter may keep track of an amount of sectors of data that have been sent. Each time the HIM module 304 receives a HIM context command or transfers a data packet, the HIM module 304 may update a sector value. When the sector value equals the length of the data, the HIM module 304 may know that all of the data associated with the host read command has been sent to the host. Additionally, after the HIM module 304 is finished sending the data associated with the host read command to the host, the HIM module 304 may issue an interrupt signal, which notifies the host and/or the other modules in the storage controller 110 that the HIM module 304 is finished sending the data associated the host read command to the host.

In some situations, the storage controller 110 may receive an abort command that instructs the storage controller 110 to abort one or more pending host read commands. If none of the data associated with a host read command to be aborted has been sent to the host, the storage controller 110 may perform an abort procedure to abort the one or more host read commands requested to be aborted.

For some example configurations, when an abort command is received, the front end module 308 may broadcast the abort command to the various control and data processing modules 318(1) to 318(M), 334(1) to 334(R) in the control and data paths 317a, 317b, 332a, 332b. In response to receiving the abort command, the processing modules 318(1) to 318(M), 334(1) to 334(R) may check associated control and data processing queues 316(1) to 316(N), 336(1) to 336(N), remove any context commands associated with the host command to be aborted, and notify the front end module 308 or other higher layer modules when it is finished. Additionally, any hardware components may be paused to ensure that they do not process any context commands that need to be removed in response to the abort command. When all of the context commands are removed, the storage controller 110 may notify the host that the abort command has been executed. Alternatively, rather than remove only the context commands from the queues that are associated with the host commands requested to be aborted, all of the host commands may be aborted and the host commands not to be aborted may be resubmitted.

As shown in FIG. 3 and as previously described, the storage controller 110 utilizes several queues and generates several sets of context commands to execute a host read command. The number of queues utilized and/or the context commands generated is multiplied when the storage controller 110 receives and has pending multiple host commands and/or has background or control data operations to be performed in addition to executing the host commands. Because of the large number of queues and context commands placed in the queues, the above-described abort procedures involving analyzing the queues and pausing hardware components may be tedious, time consuming, and prone to being performed erroneously.

Alternatively to performing the above-described abort processes, when the storage controller 110 receives an abort command to abort one or more host read commands, the control and data processing modules 318(1) to 318(M), 334(1) to 334(R) in the control and data paths 317a, 317b, 332a, 332b may operate normally as if the abort command was not received such that data associated with the one or more read commands requested to be aborted may be communicated along one of the data path 332a, 332b, processed by the data processing modules 334(1) to 334(R) in the data paths 332a, 332b, and sent to the HIM module 304 for transmission to the host. However, the HIM module 304 may recognize the data that is associated with the one or more read commands to be aborted and in turn, may prevent transmitting the data to the host.

Figure 4:
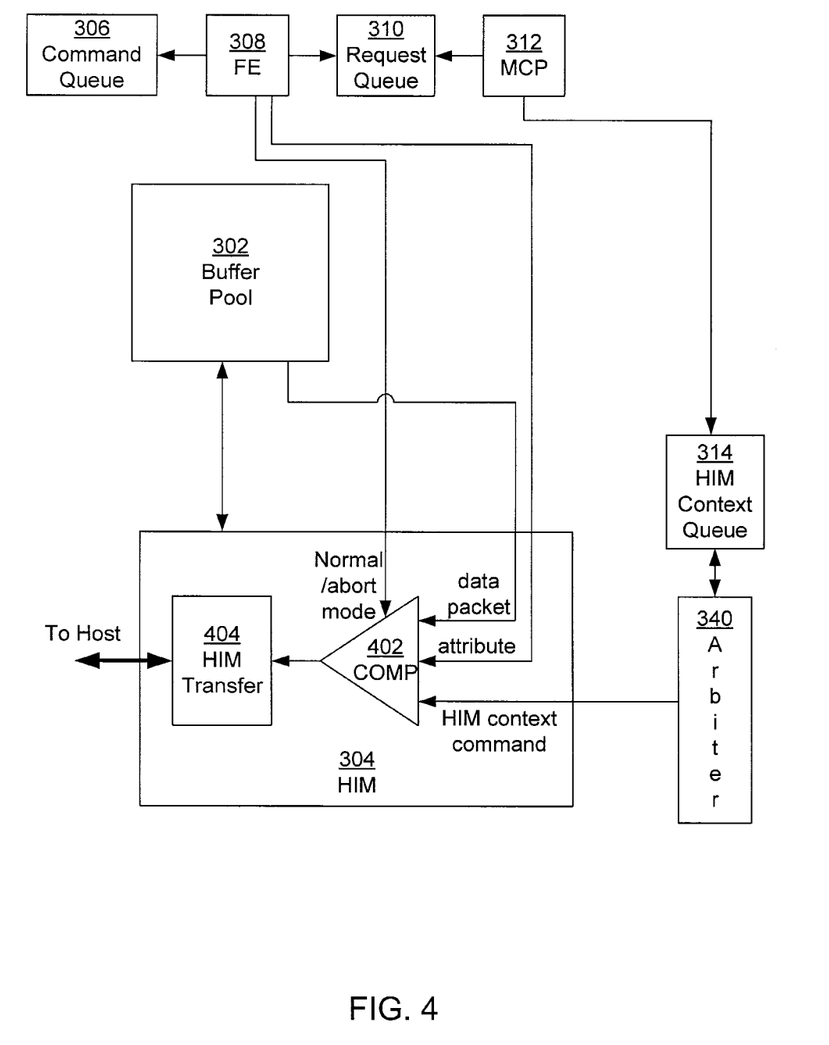
FIG. 4 is a block diagram of some of the exemplary processing modules shown in FIG. 3.

FIG. 4 shows a block diagram of a portion of the processing modules shown in FIG. 3, with an example configuration of the HIM module 304 shown in more detail. When the storage controller 110 receives an abort command to abort one or more host read commands, the storage controller 110, such as the front end module 308 of the controller 110, may determine one or more command attributes that identify the one or more host read commands to be aborted and/or that associates the abort command with the one or more host read commands to be aborted. The HIM module 304 may then use the one or more command attributes to prevent data associated with the one or more host read commands to be aborted from being sent to the host.

The command attributes that are determined and/or how they are determined may depend on the type of abort command that is received from the host. One type of abort command may be an abort command to abort a particular host read command. This type of abort command may include a command ID that identifies the host command to be aborted. When the storage controller 110 receives an abort command to abort a particular host read command, the storage controller 110 may use the command ID included in the abort command as the attribute. Another type of abort command may be a reset logic unit number (LUN) command that identifies a LUN of the non-volatile memory 120. The non-volatile memory 120 may be divided or partitioned into a plurality of portions, with each portion being assigned a LUN. A LUN reset command may be a command to abort all commands involving data to be read from or written to the portion of the non-volatile memory 120 having the LUN identified in the LUN reset command. When this type of command is received, the storage controller 110 may determine the command IDs for all of the host commands involving data to be read from and/or written to the portion of the storage having the identified LUN. A third type of abort command may be an abort-all command that requests that all pending host commands be aborted. When an abort-all command is received, the storage controller 110 may determine the command IDs for all of the pending host commands. In addition or alternatively to determining command IDs for all of the pending host commands, the data processing modules 334(1) to 334(R) may be configured to operate in a bypass mode. In the bypass mode, the data processing modules 334(1) to 334(R) may simply pass the data to a next data processing module or to the data pool 302 without performing their respective operations.

As shown in FIG. 4, the HIM module 304 may include a comparator (COMP) module 402. When the one or more command attributes are determined, the front end module 308 may program the comparator module 402 with the one or more command attributes. The comparator module 402 may then compare the programmed command attributes with command attributes included in HIM context commands received from the arbiter module 340 and/or commands attributes included in data packets received from the buffer pool 302. Based on the comparison(s), the comparator module 402 may determine whether to send a data packet associated with a host read command to the host or to prevent the data packet from being sent to the host.

As an example, the storage controller 110 may receive an abort command that includes a command ID identifying a particular host read command to be aborted. Upon receipt of the abort command, the front end module 308 may program the comparator module 402 with the command ID. During operation of processing host read commands, the arbiter module 340 may retrieve HIM context commands from the HIM context queue 314 and send the HIM context commands to the HIM module 304 when the arbiter module 340 determines that associated data is available to be sent to the host, just as the arbiter module 340 normally would if an abort command was not received. The HIM context commands may each include a command ID that identifies the host command for which the HIM context command was generated. Upon receipt of the HIM context command from the arbiter module 340, the comparator module 402 may compare the programmed command ID with the command ID included in the HIM context command. A match between the two command IDs may indicate to the comparator module 402, or the HIM module 304 generally, that the data associated with the HIM context command is not to be sent to the host because it is associated with a host read command that the host wants aborted. Alternatively, a mismatch between the two command IDs may indicate that the data associated with the HIM context command is to be sent to the host because it is not associated with a host read command that the host wants aborted.

Receipt of the HIM context command may trigger the HIM module 304 to receive a data packet that includes the data associated with the HIM context command, just as what normally would happen without receipt of an abort command. The comparator module 402 may receive the data packet and compare the programmed command ID included in the data packet with a command ID included in the data packet. If the command IDs match, then the comparator module 402 may determine that the data packet is not to be sent to the host and prevent the data packet from being sent to the host. Alternatively, if the command IDs do not match, then the comparator module 402 may determine that the data is not associated with the aborted host read command and that the data should be sent to the host. The comparator module 402 may subsequently pass the data packet to a HIM transfer module 404, which may transfer the data packet to the host. The HIM transfer module 404 may be a direct memory access (DMA) controller or other similar logic controller that is operable to communicate with and transfer data to the host.

By configuring the HIM module 304 to receive HIM context commands and data packets for any host read command, regardless of whether an abort command is received, and by comparing command attributes and preventing data packets associated with aborted host read commands from being sent to the host while allowing data packets not associated with aborted host read commands to be sent to the host when an abort command is received, multiple host read commands may be received and those not associated with an abort command may be processed and have associated data sent back to the host, even if one or more abort commands for other host read commands are pending in the storage controller.

In the event that the comparator module 402 identifies a match between a programmed command ID and a received command ID from either a context command or a data packet, the HIM module 304 may take any number of various actions to prevent the data packet from being sent to the host. For some example configurations, the HIM module 304 may drop the data packet. For other example configurations, the HIM module 304 may send the data packet to an internal memory location within the storage module 100, such as to ROM 116 as an example. Other ways of preventing the data packet from being sent to the host may be possible.

For other example configurations, rather than perform two comparisons—i.e., a first comparison involving a programmed command ID and command IDs included in a HIM context command and a second comparison involving the programmed command ID and command IDs included in received data packets—the comparator module 402 may perform only a single comparison before determining whether or not to send a received data packet to the host. For example, the comparator module 402 may only compare the programmed command ID with a command ID included the HIM context command and based on that comparison, determine whether or not to send an associated received data packet to the host. Alternatively, the comparator module 402 may not compare a programmed ID with command IDs included in the HIM context commands and instead, wait until an associated data packet is received from the buffer pool 302 before comparing command IDs.

After the HIM module 304 either sends the data packet to the host or prevents the data packet from being sent to the host, the HIM module 304 may release any resources associated with the data packet, including resources used to queue the HIM context command in the HIM context queue 314 and resources used to store the data in the buffer pool 302. Additionally, the HIM module 304 may update a counter to determine whether the comparator module 402 has received all of the HIM context commands and has prevented from sending all of the data associated with a host read command that the host wants aborted. The counter may be updated in the same way that a counter is updated when the HIM module 304 sends a data packet to the host, as previously described. If the counter reaches a threshold value, indicating that there are no more data packets to be prevented from being sent to the host, then the HIM module 304 may generate an interrupt signal indicating that execution of the abort command is complete.

Additionally, the comparator module 402 may perform similar actions when it is programmed with multiple command IDs, such as if a reset LUN command or an abort-all command is received. That is, the comparator module may compare received command IDs included in HIM context commands and/or data packets with a plurality of command IDs and determine whether the received command IDs match any of the plurality of programmed command IDs.

In addition or alternatively to command IDs, the HIM module may use a bypass flag as an attribute to determine whether to send a data packet to a host. In some situations, if an abort-all command is received from the host, a bypass flag included in the HIM context commands may have a positive indication, indicating to the HIM module 304 to bypass sending an associated data packet to the host. When the HIM module 304 detects the bypass flag with the positive indication, the HIM module 304 may prevent an associated data packet from being sent to the host, just as it would when determining a match between compared command IDs.

For some example configurations, the comparator module 402 may be configured to operate in and switch between operating in a normal mode of operation and an abort mode of operation, and may determine whether to prevent a received data packet from being sent to the host only when it is configured in the abort mode. Alternatively, when configured in the normal mode, the comparator module 402 may pass received HIM context commands and data packets to the HIM transfer module 404 without analyzing command attributes and/or performing attribute comparisons.

The front end module 308 may be configured to set the comparator module 402 in either the normal mode or the abort mode. If there are no pending abort commands, then the comparator module 402 may be configured in the normal mode. Upon receipt of an abort command, the front end module 308 may configure the comparator module 402 in the abort mode. In the abort mode, when the HIM module 304 determines that there are no more data packets to prevent from being sent to the host, such as when the counter reaches a threshold count, the HIM module 304 may issue an interrupt signal as previously described. The issuance of the interrupt signal may cause the HIM module 304 to be configured back into the normal mode, assuming there are no other pending abort commands such that the comparator module 402 should still be configured in the abort mode. For some example configurations, the HIM module 304 may issue the interrupt signal to the host. In response, the host may send a reset signal back to the storage module 100, which may cause the front end module 308 to reconfigure the comparator module 402 in the normal mode.

Figure 5:
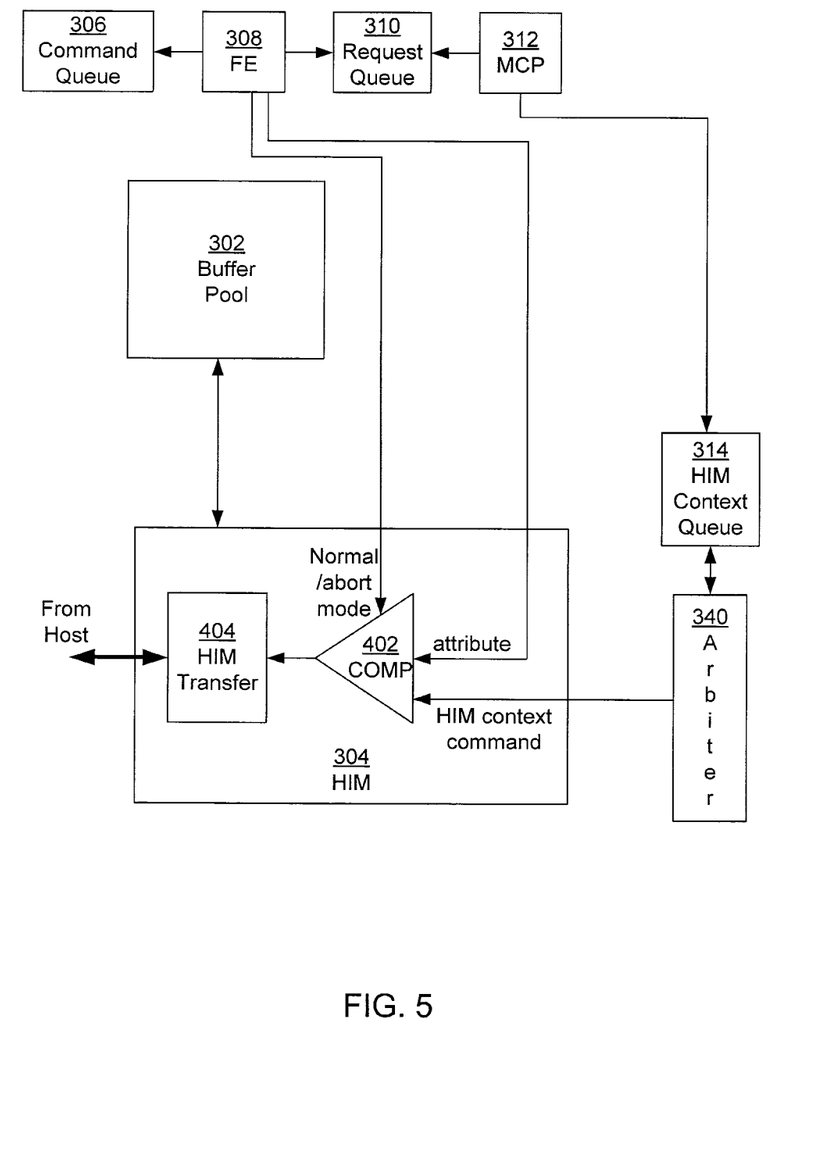
FIG. 5 is a block diagram of the exemplary processing modules shown in FIG. 4, but from the perspective of a write operation.

FIG. 5 shows a block diagram of the processing modules shown in FIG. 4, but in the context of aborting a host write command. When host a write command is received by the storage controller 110, it may be queued in the command queue 306 and also queued by the front end module 306 in the request queue 310, similar to the initial queue operations with host read command. The MCP module 312 may retrieve the host write command from the request queue 310 and generate a set of HIM context commands associated with the host write command and queue the HIM context commands in the HIM context queue 314. For write commands, the HIM context commands that are generated may include information that the HIM module 304 uses to initiate a data transfer and then transfer data associated with the write command from the host to the buffer pool. To initiate a data transfer, the HIM module 304 may determine a source address (i.e., the host address) of the data, a destination address (i.e., an address in the buffer pool 302), and a size of the data to be transferred. With that information, the HIM module 304 may reserve space in the buffer pool 302 for the transferred data to be stored until the data is then written to the non-volatile memory 120.

When the arbiter module 340 determines that the HIM module 304 is ready to receive data from the host, the arbiter module 340 may retrieve a HIM context command associated with the write command from the HIM context queue 314 and send the HIM context command or information included in the HIM context command to the HIM module 304. Assuming that an abort command to abort the write command associated with the HIM context command has not been received, the comparator module 402 may send the HIM context command to the HIM transfer module 404, which may initiate a data transfer for data associated with the HIM context command. The data may then be transferred from the host to the buffer pool 302 via the HIM module 304. After the data is transferred, the HIM module 304 may update a counter indicating when a last HIM context command and/or a last data packet associated with the write command is received. In the event that the count indicates that no more HIM context commands or data packets associated with the write commands are to be received, the HIM module 304 may issue an interrupt signal indicating that all of the data packets are in the buffer pool 302.

In the event that the controller module 110 receives an abort command to abort a host write command, the host will not send data associated with that host write command. For some example configurations, when an abort command is received, the front end module 308 may broadcast the abort command to other processing modules within the storage module 100, which may cause the processing modules to filter out any context commands associated with the aborted write command from respective queues. Additionally, hardware modules, including one or more components of the HIM module 304, may be paused to ensure that context commands associated with the aborted write command are not processed in hardware while the context commands are being filtered out of the queues. Eventually, the HIM module 304 in a paused state may timeout and issue a timeout notification to the host, which may respond by sending a signal that reconfigures the HIM module 304 back into a normal state of operation.

Alternatively to the above-described abort process to abort a host write command, the storage controller 110 may be configured to determine a command attribute that identifies or associates HIM context commands with host write commands to be aborted. The HIM module 304 may use the command attribute to prevent initiating the data transfer when it receives a HIM context command for an aborted write command. This way, the HIM module 304 does not have to be paused when an abort command to abort a host write command is received and instead, can continue to receive and process HIM context commands received from the arbiter module 340.

In one example, when an abort command is received, the abort command may include a command ID identifying the host write command to be aborted. The front end module 308 may program the comparator module 402 with the command ID. When the comparator module 402 receives HIM context commands from the arbiter module 340, the comparator module 402 may compare the programmed command ID with a command ID in the HIM context command. A mismatch between the command IDs may indicate that the received context command was not generated for a host write command to be aborted. In response to the mismatch, the comparator module 402 may pass the HIM context command to the HIM transfer module 404 which may initiate a data transfer for associated data from the host to the buffer pool 302.

Alternatively, a match between the command IDs may indicate that the received context command was generated for a host write command to be aborted. In response to the match, the HIM transfer module 404 may not initiate a data transfer for associated data from the host to the buffer pool. In particular, the HIM transfer module 404 may not identify or store within any registers information need to perform the data transfer, including the source address, the destination address, and the length of the data. In addition, the HIM transfer module 304 may not reserve any space or other resources for the data to be stored in the buffer pool 302. Further, the HIM module 304 may release any resources used to queue the HIM context command in the HIM context queue 314. The HIM module 304 may perform these actions without being paused and may be ready for a next HIM context command from the arbiter module 340.

Additionally, when an abort command to abort a host write command is received, the front end module 308 may be configured to switch the comparator module 402 from a normal mode of operation to an abort mode of operation, as previously described with respect to aborting host read commands. When the HIM module 304 determines that there are no more HIM context commands associated with the host write command to be received, the HIM module 304 may issue an interrupt signal, which may cause the host to send a reset signal to storage module 100 that causes the front end module 308 to switch the comparator module 402 back to the normal mode of operation.

Figure 6:
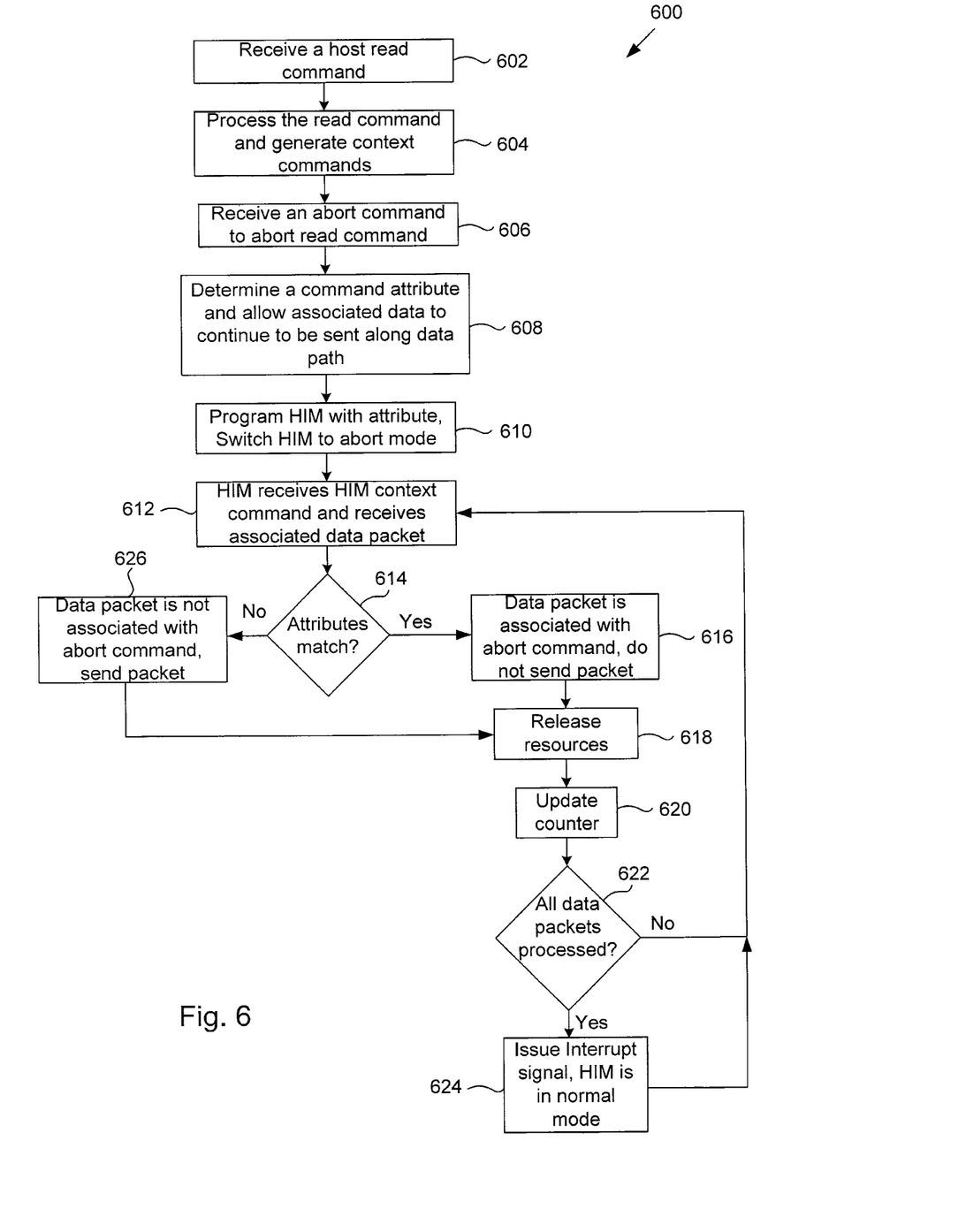
FIG. 6 is a flow chart of an exemplary method of aborting a host read command.

FIG. 6 is a flow chart of an example method 600 of aborting a host read command to read data from non-volatile memory of a storage module. At block 602, the host read command may be received by the storage module from a host. At block 604, processing modules of a storage controller of the storage module may process the host read command and generate a plurality of sets of context commands used to transfer the data along a data path from the non-volatile memory to a buffer pool located internally to the storage controller, and then from the buffer pool to the host using a host interface module. Along the data path, the data may be checked for errors and/or decoded/decrypted before being stored in the buffer pool.

At block 606, the storage controller may receive an abort command to abort the host read command. At block 608, a front end module of the storage controller may determine a command attribute that identifies the host read command to be aborted or otherwise associates the abort command with the host read command. The command attribute may be the same attribute that is included in generated HIM context commands associated with the host read command, such as a command ID. Additionally, when the abort command is received, if all of the data associated with the host read command to be aborted is not stored in the internal buffer pool, the processing modules may allow any remaining data associated with the aborted host read command to be transferred along the data path to the buffer pool.

At block 610, the front end module may program the HIM module, such as a comparator of the HIM module, with the command attribute. The front end module may also switch the comparator from being configured in a normal mode of operation to an abort mode of operation as previously described. The front end module may program the comparator and/or switch the comparator to the abort mode without broadcasting the abort command to other processing modules in the storage controller and without pausing any hardware components, including any hardware components of the HIM module.

At block 612, the comparator may receive a HIM context command from an arbiter module to start a transfer of an associated data packet from the buffer pool to the host. At block 614, in response to receiving the HIM context command, the comparator, in the abort mode, may compare the programmed command attribute with a command attribute in either the received HIM context command and/or the associated data packet. The comparator may perform the comparison(s) to prevent any data packets associated with the aborted host read command from being sent to the host while allowing data packets not associated with the aborted host read command to be sent to the host.

If the command attributes match, then at block 616 the comparator may determine that the data packet is associated with an aborted host read command and prevent the data packet from being sent to the host. For some example methods, the comparator may prevent the data packet from being sent to the host by dropping the data packet. For other example methods, the comparator may prevent the data packet from being sent to the host by sending the data packet to an internal location, such as a portion of a read-only memory, in the storage module.

At block 618, the comparator may release any resources associated with storing the data packet in the buffer pool and queuing the HIM context command in the HIM context queue. At block 620, the HIM module may update a counter associated with HIM context command and the data packet. At block 622, based on the update of the counter, the HIM module may determine if all of data packets associated with a host read command have been processed. If so, then at block 624, the HIM module may issue an interrupt signal indicating that it has received and processed all of the HIM context commands and data packets associated with a host read command. Issuing an interrupt signal may also cause the comparator to be switched back to the normal mode of operation if it is not in the normal mode already. Referring back to block 622, if all of the data packets associated with a host read command have not been processed, then the method may proceed back to 612 without issuing an interrupt signal, where the comparator may receive another HIM context command from the arbiter module.

Proceeding back to block 614, if the command attributes do not match, then at block 626, the comparator may determine that the data packet is not associated with an aborted host read command and may send the data packet to the host. The method may then proceed to blocks 618-624 to release any resources, update a counter, and issue an interrupt signal if all of the data packets associated with a host read command have been received and processed.

Figure 7:
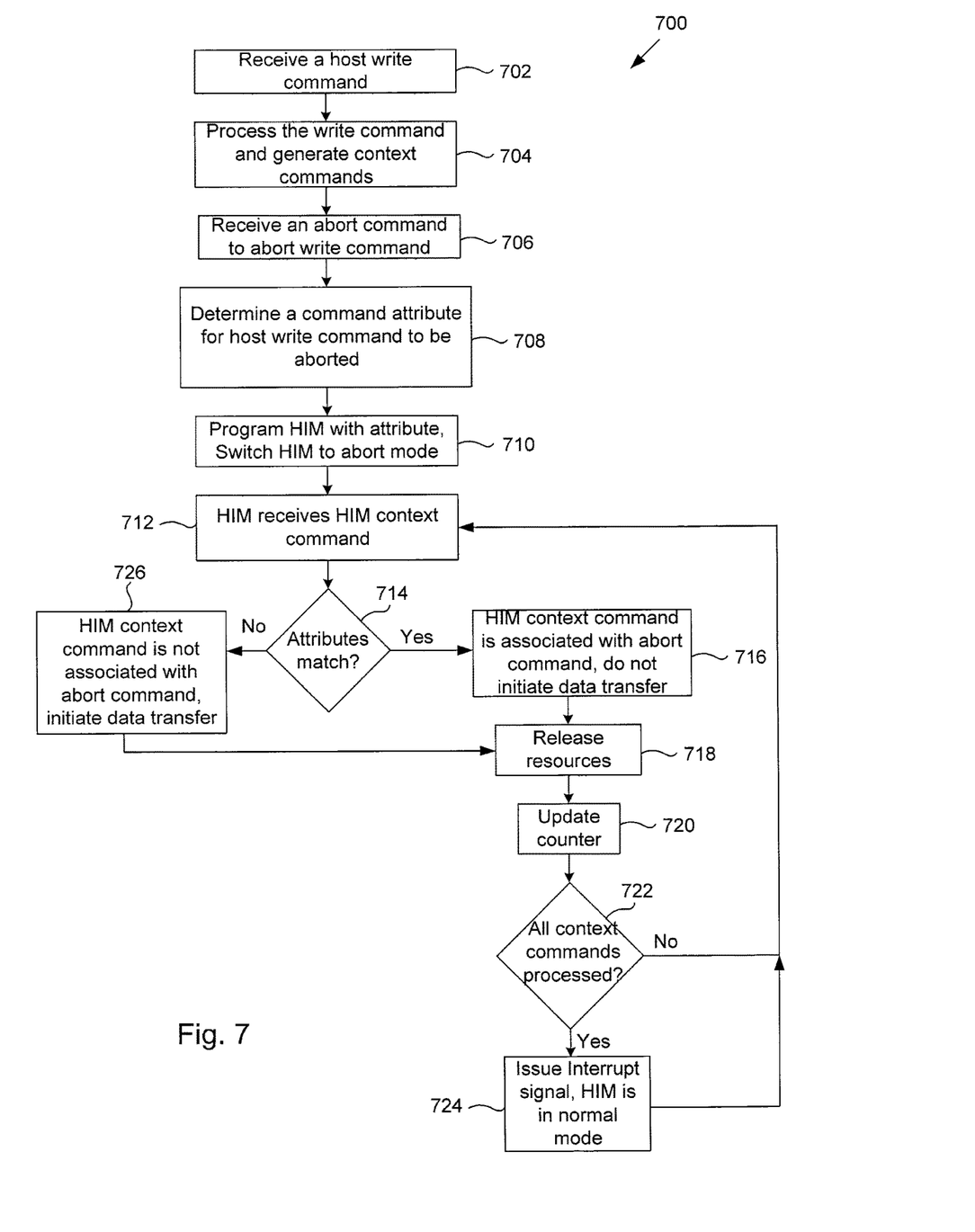
FIG. 7 is a flow chart of an exemplary method of aborting a host write command.

FIG. 7 is a flow chart of an example method 700 of aborting a host write command to write data to non-volatile memory of a storage module. At block 702, the host write command may be received by the storage module from a host. At block 704, processing modules of a storage controller of the storage module may process the host write command, and generate and queue in a HIM context queue a set of HIM context commands used to initiate the transfer of data associated with the write command from the host to a buffer pool within the storage controller.

At block 706, the storage controller may receive an abort command to abort the host write command. At block 708, a front end module of the storage controller may determine a command attribute that identifies the host write command to be aborted or otherwise associates the abort command with the host write command. The command attribute may be the same attribute that is included in generated HIM context commands associated with the host read command, such as a command ID.

At block 710, the front end module may program the HIM module, such as a comparator of the HIM module, with the command attribute. The front end module may also switch the comparator from being configured in a normal mode of operation to an abort mode of operation as previously described. The front end module may program the comparator and/or switch the comparator to the abort mode without broadcasting the abort command to other processing modules in the storage controller and without pausing any hardware components, including any hardware components of the HIM module.

At block 712, the comparator may receive a HIM context command from an arbiter module to start a transfer of an associated data packet from the host to the buffer pool. At block 714, in response to receiving the HIM context command, the comparator, in the abort mode, may compare the programmed command attribute with a command attribute in the received HIM context command.

If the command attributes match, then at block 716 the comparator may determine that the HIM context command is associated with an aborted host write command and not initiate the data transfer. In doing so, the comparator may not store a source address, destination address, length information, or reserve any resources in the buffer pool that may otherwise be reserved for the transfer of data associated with the HIM context command.

At block 718, the comparator may release any resources associated with queuing the HIM context command in the HIM context queue. At block 720, the HIM module may update a counter associated with HIM context command. At block 722, based on the update of the counter, the HIM module may determine if all of the HIM context commands associated with a host write command have been received and processed. If so, then at block 724, the HIM module may issue an interrupt signal indicating that it has received and processed all of the HIM context commands. Issuing an interrupt signal may also cause the comparator to be switched back to the normal mode of operation if it is not in the normal mode already. Referring back to block 722, if all of the HIM context commands associated with the host write command have not been processed, then the method may proceed back to 712 without issuing an interrupt signal, where the comparator may receive another HIM context command from the arbiter module.

Proceeding back to block 714, if the command attributes do not match, then at block 726, the comparator may determine that the HIM context command is not associated with an aborted host write command and may initiate the data transfer, including storing any information related to the data transfer such as the source address, destination address, and length, and reserve any resources for storing the data packet in the buffer pool, and then start the data transfer. The method may then proceed to blocks 718-724 to release any resources associated with queuing the HIM context command, updating a counter, and issuing an interrupt signal if all of the HIM context queues associated with a host write command have been received and processed.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for performing a virtual abort, the method comprising:
   performing the following in a storage module having a memory, a host interface module, a buffer pool, and a data path between the memory and the host interface module, the buffer pool configured at the end of the data path, the storage module configured to communicate with a host via the host interface module, wherein the data path comprises at least one processing module:
   receiving a read command from the host to read data from the memory;
   in response to receiving the read command, starting to perform a read operation, wherein the read operation comprises reading the data from the memory, processing the data by the at least one processing module as the data moves along the data path, loading the data into the buffer pool upon being processed by the at least one processing module, and then providing the data to the host via the host interface module;
   receiving an abort command to abort the read command before the data is loaded in the buffer pool at the end of the data path and provided to the host; and
   in response to receiving the abort command before the data is loaded in the buffer pool, allowing the data associated with the read command that is read from the memory to be processed by the at least one processing module of the data path and loaded in the buffer pool for transmission by the host interface module to the host, but preventing the host interface module from providing the data to the host.

2. The method of claim 1, wherein the read command is associated with an attribute, and wherein the host interface module prevents the data from being provided to the host using the attribute.

3. The method of claim 2, wherein the abort command specifies the attribute, a logic unit number of the memory, or that all host commands are to be aborted.

4. The method of claim 2, wherein the attribute comprises a first attribute, the method further comprising:
   programming the host interface module with the first attribute;
   receiving, with the host interface module, a data packet from a buffer;
   comparing, with the host interface module, a second attribute associated with the data packet with the first attribute;
   sending, with the host interface module, the data packet to the host when the second attribute does not match the first attribute; and
   preventing, with the host interface module, the data packet from being sent to the host when the second attribute matches the first attribute.

5. The method of claim 4 further comprising:
   configuring the host interface module in a normal mode when no abort commands are pending, wherein the host interface module does not perform attribute comparisons in the normal mode;
   in response to receiving the abort command, configuring the host interface module in an abort mode,
   wherein the host interface module compares the second attribute with the first attribute when configured in the abort mode.

6. The method of claim 5 further comprising:
   configuring the host interface module from the abort mode to the normal mode in response to determining that all of the data packets associated with the read command have been prevented from being provided to the host.

7. The method of claim 1, wherein the storage module prevents the host interface module from providing the data to the host by writing the data to a read-only memory in the storage module instead of providing the data to the host.

8. The method of claim 1, wherein the storage module prevents the host interface module from providing the data to the host by releasing the data from the buffer pool without sending the data to the host.

9. The method of claim 1, wherein the at least one processing module comprises one or more of the following: a decryption module and an error correcting module.

10. The method of claim 1 further comprising:
receiving a plurality of read commands; and
executing one or more of the plurality of read commands other than the read command to be aborted while the abort command is pending.

11. The method of claim 1, wherein the memory is a three-dimensional memory.

12. The method of claim 1, wherein the storage module is embedded in the host.

13. The method of claim 1, wherein the storage module is removably connected to the host.

14. A method for performing a virtual abort, the method comprising:
performing the following in a storage module having a memory and a host interface module:
receiving a write command from a host to write data into the memory;
in response to receiving the write command and before the host interface module receives the data from the host, starting to perform a write operation, wherein the write operation comprises generating one or more context commands used by the host interface module to initiate a data transfer of the data from the host to the storage module;
receiving an abort command to abort the write command before the host interface module receives the data associated with the write command; and
in response to receiving the abort command:
receiving, with the host interface module, the one or more context commands to initiate the data transfer of the data from the host to the storage module; and
refraining, with the host interface module, from initiating the data transfer of the data from the host to the storage module in response to receiving the one or more context commands.

15. The method of claim 14, wherein the write command is associated with an attribute, and wherein the host interface module does not initiate the data transfer using the attribute.

16. The method of claim 15, wherein the abort command specifies the attribute, a logic unit number of the memory, or that all host commands are to be aborted.

17. The method of claim 15, wherein the attribute comprises a first attribute, the method further comprising:
programming the host interface module with the first attribute;
receiving, with the host interface module, a context command from an arbiter module;
comparing, with the host interface module, a second attribute included in the context command;
initiating, with the host interface module, a data transfer to receive data from the host when the second attribute does not match the first attribute; and
preventing, with the host interface module, the data transfer from being initiated when the second attribute matches the first attribute.

18. The method of claim 17, further comprising:
configuring the host interface module in a normal mode when no abort commands are pending, wherein the host interface module does not perform attribute comparisons in the normal mode;
in response to receiving the abort command, configuring the host interface module in an abort mode,
wherein the host interface module compares the second attribute with the first attribute when configured in the abort mode.

19. The method of claim 18, further comprising:
configuring the host interface module from the abort mode to the normal mode in response to determining that all of the context associated with the write command have been prevented from being provided to the host.

20. The method of claim 14, wherein refraining from initiating the data transfer of the data from the host to the storage module comprises refraining from reserving space in a buffer pool for the data to be stored after the data is received from the host and before the data is stored in the memory.

* * * * *